United States Patent
Ward

(10) Patent No.: US 6,821,395 B1
(45) Date of Patent: Nov. 23, 2004

(54) SOLAR STILLS OF THE TILTED TRAY TYPE, FOR PRODUCING PURE DRINKING WATER

(75) Inventor: John Ward, Semaphore (AU)

(73) Assignee: Ian McBryde, Walkerville (AU); part interest ( * ) Notice: Subject to any disclaimer, the term of this patent is extended or adjusted under 35 U.S.C. 154(b) by 296 days.

(21) Appl. No.: 09/624,136

(22) Filed: Jul. 21, 2000

(51) Int. Cl.[7] .............................. B01D 3/02; C02F 1/14
(52) U.S. Cl. ........................ 203/10; 203/86; 203/100; 203/DIG. 1; 202/234; 202/267.1; 159/903; 159/DIG. 15
(58) Field of Search .............................. 203/10, DIG. 1, 203/100, DIG. 17, 86; 202/234, 267.1; 159/903, DIG. 15; 126/684

(56) References Cited

U.S. PATENT DOCUMENTS

| | | | | | |
|---|---|---|---|---|---|
| 3,613,659 A | * | 10/1971 | Phillips | ...................... | 126/605 |
| 3,655,517 A | * | 4/1972 | Hensley et al. | ............. | 202/234 |
| 4,312,709 A | * | 1/1982 | Stark et al. | ................... | 202/83 |
| 4,487,659 A | * | 12/1984 | Stark | .......................... | 202/172 |
| 4,495,034 A | * | 1/1985 | Lucas | ......................... | 202/181 |
| 4,530,348 A | * | 7/1985 | Kaufman | .................... | 126/668 |
| 5,496,414 A | * | 3/1996 | Harvey et al. | .............. | 136/245 |
| 5,628,879 A | * | 5/1997 | Woodruff | .................... | 202/234 |

\* cited by examiner

*Primary Examiner*—Virginia Manoharan
(74) *Attorney, Agent, or Firm*—Crowell & Moring LLP

(57) ABSTRACT

A solar of still of the tilted tray type having a black absorber member forming a plurality of cells. A glass window is positioned closely adjacent the cell distortion of the absorber, and a reflector beneath the absorber.

3 Claims, 2 Drawing Sheets

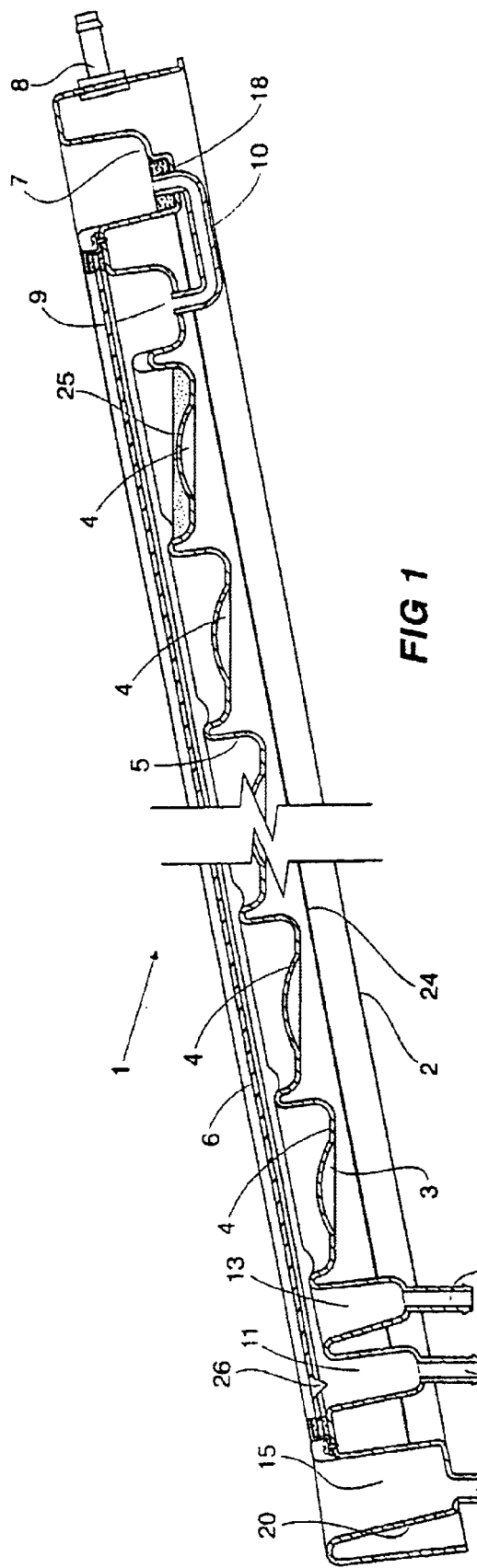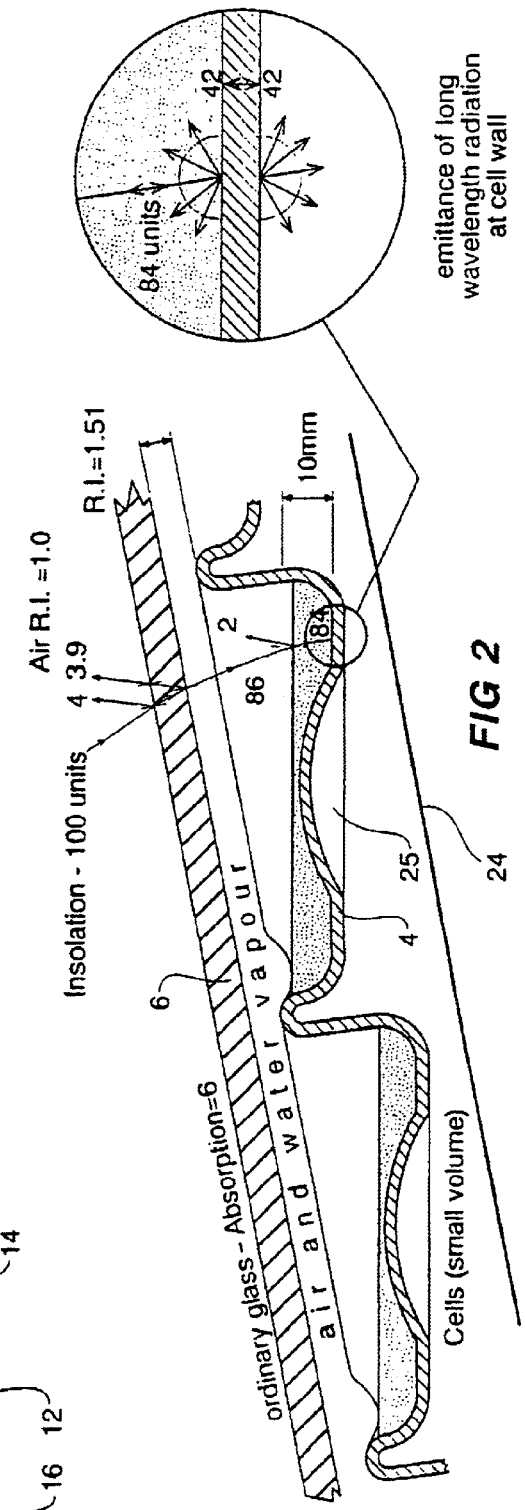

SOLAR STILLS OF THE TILTED TRAY TYPE, FOR PRODUCING PURE DRINKING WATER

This invention relates to solar stills, more particularly to the tilted tray type of solar still.

BACKGROUND OF THE INVENTION

Solar operated stills for converting bore, brackish, impure or salt water into pure drinking water have been widely studied and reported since 1952 (Reference 1). The heat required for the operation of such a still can be provided by solar energy. However, it can also be used with any other source of input hot water, such as water heated by gas, electricity, wood or effluent etc.

In particular, stills of the absorbing panel type and variously described as; stepped tray, stacked tray or tilted tray are well known in principle to consist of an absorber panel having a plurality of interconnected calls containing a shallow layer or pond of impure water.

A glass panel positioned above the absorber panel and in close proximity to the water surface acts as a solar window, a condensing surface and a convection, minimising device.

The absorber panel and glass cover combination system is typically inclined to the horizontal at an angle of about 10° thus preventing condensed droplet refluxing.

Commonly, the glass, outer surface is used for the collection of rainwater.

A description now follows of a patent application including various important and improved techniques and devices which are applicable to any such tilted tray system. Incorporation of these features singly or in combination into any existing system, will result in a considerable increase in the output of potable water as well as a greater convenience in operation with respect to optimised solar siting, solar energy collection, internal plumbing and cleaning of the absorber panel.

BRIEF SUMMARY OF THE INVENTION

Thus there is provided in one form of the invention a solar still of the tilted tray type, said still including a glass cover and a plurality of individuals cells containing the solution to be evaporated, the solar still having means to cast a shadow to enable the solar still to be oriented with reference to the solar radiation to maximise the output of the solar still.

In a preferred form the means to cast the shadow includes a nodus to cast a shadow on a screen whereby the solar still can be orientated for any particular angle of incidence of the solar radiation.

In another form of the invention there is provided a solar absorber for heating a fluid, said absorber having a black panel to absorb th e solar radiation, the absorber including a reflector positioned beneath the panel to redirect the black-body radiation to be absorbed by the black panel to enhance the overall heat gain.

In a preferred form of the invention the solar absorber is a solar still of the sited tray type having a plurality of individual cells formed in a black panel, the reflector being a long wavelength reflector such as aluminium foil positioned directly beneath the base of the absorber panel.

Also in another form of the invention the solar still of the tilted tray type is provided with a drip check on the undersurface of the glass panel to ensure that the distilled product drips into an outlet channel.

In a further form of the invention the solar still has a plurality of individual cells formed in the black panel wherein some or all of the calls are provided with means to prevent or substantially eliminate distortion of the calls and the base due to heating of the base.

Preferably the panel is a plastic member, and the means to prevent or substantially eliminate distortion in the cells and base include a concave or convex portion in the panel or the cells.

In a still further form of the invention the solar still includes a black absorber panel having a plurality of individual cells, a glass sheet positioned above the cells in close proximity to the cells, preferably in the range of 10 to 20 mm above the uppermost portion of each cell.

BRIEF DESCRIPTION OF THE DRAWINGS

In order to more fully describe the invention reference will now be made to the accompanying drawings, in which:

FIG. 1 is cross sectional view of a solar still incorporating features of the invention, FIG. 2 is an enlarged sectional view of the still showing the radiation trapping.

DETAILED DESCRIPTION OF THE PREFERRED EMBODIMENT

Figure 3:
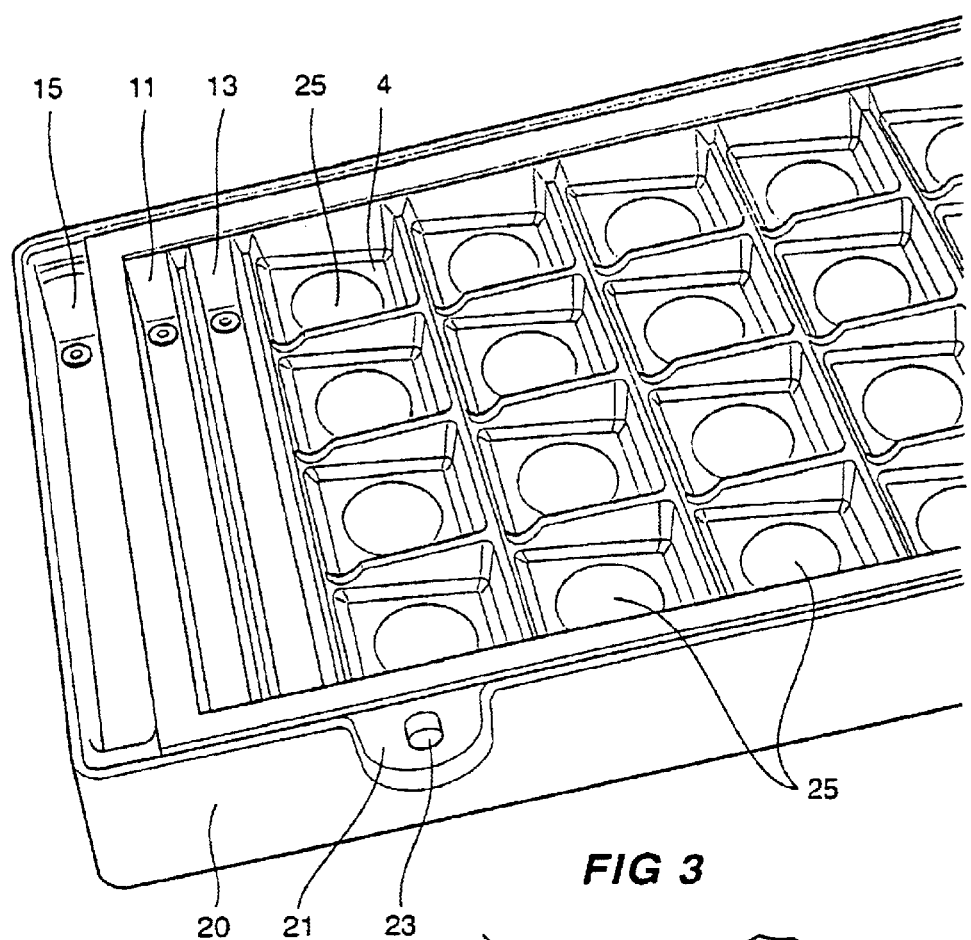
FIG. 3 is a view of portion of the solar still.
Figure 4:
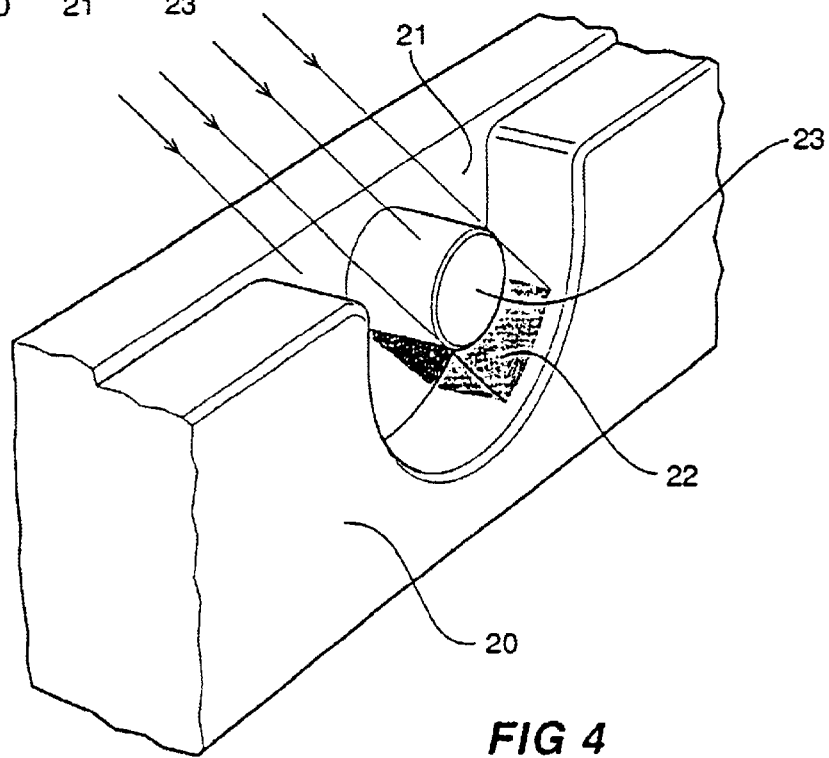
FIG. 4 is an enlarged view of the sunfinder.

Referring to the drawings, the solar still 1 has a base. The base 2 supports a black panel 3 forming a plurality of cells 4 with thin dividing walls 5 to each contain a shallow depth of water to be purified. A tempered glass window 6 is positioned above the panel. The still is inclined to the horizontal and the cells are so shaped that water to be purified flows from one row of cells to the next lower row of cells, and consequently from the upper end to the lower end of the still.

At the upper end of the still there is provided an input channel 7 through which the water to be purified can be supplied by an input fitting 8, and pass through filter 18 and transfer tube 10 to distribution channel 9 which is positioned under the glass so that heating and initial distillation can take place in the distribution channel 9. In the situations where a continuous supply is not available through input u-tube 8, the water to be purified can be manually supplied into the channel 7 by bucket or other utensil.

At the lower end of the still 1, the distilled water which collects on the underside of the glass window 6 is collected in distilate channel 11 for discharge through distillate outlet 12, by the water dripping off drip check 26 positioned above the outlet 12 on the undersurface of the glass window 6.

The lowermost cell when full overflows a weir into an overflow channel 13 where the waste liquid can be discarded or if desired recycled through the still. A further channel 15 can be positioned at the lowermost end of the still 1. The top surface of the glass window feeds rainwater into this channel for collection through outlet 16.

Beneath the black panel, the still includes a long wavelength reflector 24 to reflect back to the panel the heat radiated from the lower surface of the black panel, as more fully explained below.

The still includes a device called a sun-finder to assist in correctly siting the still with respect to the sun. On one side of the casing 20 there is a semicircular recess 21 the surface of which forms a screen onto which the shadow 22 of a nodus 23 falls. The recess opens to the top of the base 20 so that the recess is open to the suns rays.

Solar Siting with a Sunfinder

The position of the sun in the sky varies throughout the day and year for every place on Earth. The glass window covering the absorber panel has a relatively high refractive index (1.51 in the visible spectrum is typical) and a consequent high reflectivity at all angles of incidence. Even at normal incidence, the reflectivity loss is about 8% of the total, incoming radiation. At all other angles of incidence the glass reflectivity is much higher, e.g. at 70°, the reflectivity is about 18%.

These values can readily be calculated using Fresnel Coefficients. Unfortunately, very little can be done to prevent this sunlight, reflection loss.

Ideally, the glass surface could be anti-reflection coated and track the sun so that its rays are always incident normally. This ideal configuration would seriously degrade the distilling process.

A commonly proposed, compromise solution, would involve tilting the solar still to the latitude angle of the location. Again, a degradation in output would occur due to droplet refluxing prior to reaching the distillate, collection channel. All such proposals are necessarily, lossy ones and overall a low transmission, compromise solution is achieved. A moderately, satisfactory solution is brought about when the solar still is inclined at an angle of about 10° to the horizontal and faces the sun symmetrically for as many hours of the day as possible prior to and after solar noon.

This situation can most readily be achieved with the aid of a sunfinder. This device can be an integral part of the still itself formed during the manufacturing process. It enables accurate positioning of the still with respect to the sun for any location and at any time during the day. In use, the still is levelled with a spirit level or alternatively by filling the input channel with impure water until such time as the water is symmetrically deep at each end of the channel, thus eliminating a spirit level, the panel is then rotated in a horizontal plane whilst maintaining a level position, until the shadow cast by the nodus falls completely onto the screen. The still is then correctly sited for maximum output at that location and for that time of day. It can thus be used optimally, early or late in the day as required, for camping, early or late departure and arrivals and the like.

Alternatively, it can be used to accurately locate the still at solar noon when used in a fixed position to maximise the output of potable water.

Solar Energy Collection Conditions

A large number of individual cells for the solution form an array with surrounding thin walls in close proximity to the glass window. This arrangement considerably improves the overall output of the still. It is considered that as the vapour rises it strikes the underside of the glass sheet resulting in turbulence in each cell. The close proximity of the glass ensures that maximum turbulence occurs in each cell which turbulence minimises the convective flow of air and vapour mixture along the under surface of the glass window. Preferably the distance between the upper portion of each cell and the undersurface of the glass is of the order of 10 to 20 mm which results in a mean distance of the water surface to the glass of 15 mm.

Now, referring to the figures the radiation trapping and heating absorption transfer mechanism from the cell walls to the solution is shown.

Assuming 100 units of insolation is incident normally on the ordinary glass window, (this 2.5 mm thick, green, float glass is recommended because of its low cost, worldwide availability and reasonably good transmittance characteristics in the heat wavelength region of the sun emitted between about 0.6 and 1.6 microns) 4 units will be reflected at the upper surface and a further, approximately 3.9 units at the lower surface. After window absorption of about 6 units, in effect, 86 units will strike the surface of the solution where 2 units will be reflected and thus 84 units enter the solution, strike the black cell wall, and then be absorbed.

It should be noted here, that the thin layer (~10 mm) of solution will have negligible absorption in this wavelength region.

The resultant, hemispherical emittance from each surface of the lower cell wall is about 42 units, and thus the 84 units of directly absorbed near infra-red radiation will be re-radiated as black body radiation at wavelengths having a maximum output between 8 and 10 microns. The long wavelength reflector 24 such as aluminium foil will redirect this radiation back to the cells where it will be absorbed and the consequent heat rise transferred by thermal conductance to the solution thereby enhancing the overall heat gain.

The re-radiated energy from the upper surface of the lower cell wall will be directly absorbed by the solution.

The sealed cavity behind the absorber panel is full of stationary air which acts as a good, thermal insulator. This is especially so when the air is dry.

If required, the cavity can be filled with polyurethane foam or similar, which provides good thermal insulation as well as an increase in mechanical rigidity. However, it is important to ensure that no leakage of solution takes place into the cavity between top and bottom panels of the unit. In particular, moist air and water vapour are excellent thermal conductors and massive reductions in potable water output can result should the cavity contain even small volumes of water. Two breathing holes are located in the uppermost level of the still so that if, inadvertently, water should enter the cavity beneath the stepped tray, array, absorber panel, then the water vapour produced from this leakage due to the operational temperature of the still, and any other vapours are removed through these breathing holes.

Leak free, corrosion resistant outlets and connectors are a requirement for long life and reliability. Suitable materials are brass and stainless steel. Outlet connectors 12 of brass can readily be fitted with black plastic pipe for directing the appropriate channel contents into the required container.

The drip check 25 consisting of a triangular section, acrylic plastic rod is cemented with a suitable, ultra violet light resistant, silicone adhesive to the underside of the glass window. The rod extends in either a straight or curved line across the full width of the window. It is so arranged that the condensate is precisely directed into the appropriate collection channel thus removing any probability of water seepage into the seal between the glass window and the body of the still, with consequent breakdown of the essential vapour tight seal required for high condensate output.

When using plastic material as an absorber panel, a major problem overall is that of large thermal expansion with increase of temperature. Coefficients of volumetric thermal expansion in different temperature regions are well documented and typically, as the temperature rises the coefficient of thermal expansion also increases. For many common plastics with potential use as a solar still, a median value of co-efficient of thermal expansion around 100° C. is about $2 \times 10^{-4}$ cm/cm/° C. This is the linear coefficient, the volumetric value will be three times larger than this.

On cooling down after exposure under glass to sunlight, many plastics do not return to their original shape and dimensions. This is as a result of hysteresis, and permanent thermal expansion can result even after a few hours of exposure to high temperatures. For example shade temperatures of 25° C. result in stagnation temperatures of the plastic of 100° C. with no liquid in the solar still. Shade temperatures of 35° C. result in stagnation temperatures of about 115° C.

The resultant distorted appearance of the still would be unattractive and the distilled water output may be less than that from an undistorted still.

In an attempt to overcome this basic problem, a concept has been incorporated which has many similarities to thermal expansion joints in masonry walls and railway ties.

Thus in accordance with an embodiment of the invention, there are formed in the plastic member or solar still are one or more thermal expansions domes 25 which are concave or convex an the surface of the plastic material.

Reference is made to the accompanying drawings which show in cross section a thermal expansion dome formed in the base of a cell of the solar still. In a preferred form of the invention each thermal expansion dome (TED) can be vacuum formed in the shape of a convex spherical meniscus lens and is located symmetrically on the base of each tray. Either a single dome or multiple domes can cover all or part of each tray. In the example shown one dome can be formed in each cell of the absorber tray or panel.

Preferably in a vacuum formed solar still, the plastic at the highest point of the dome (about 5 or 6 mm) can be thicker than the tray base and this resulted in the dome growing and shrinking in height as it was thermally cycled without distortion taking place in the tray or absorber panel.

In the case of a blow or injection moulded solar still, both the dome and the tray base are of the same thickness. On heating, the thermal expansion stress would be re-directed symmetrically along the curved surface of the dome, thus relieving the tray base of the thermally induced strain,— once again no noticeable distortion would take place.

The dome can either be convex or concave. If convex, the liquid depth and volume would decrease, conversely if concave, the depth and volume would increase The concave TED would be of course much easer to clean and would also heat up more slowly. A convex TED would be more difficult to clean but would heat up more quickly than a flat bottomed tray.

A convex domed solar still formed from suitable plastic material was tested for prolonged periods on a solar simulator at a stagnation temperature of 130° C. No distortion took place. Without domes, distortion would result at temperatures in excess of 110° C.

Such domes would have cosmetic and functional application in many other instances where plastic materials are thermo-cycled.

After a prolonged period of use, the total dissolved solids (TDS) in the solution being processed will be deposited onto the base of each cell in the array. The deposit on the cell walls is insignificant.

When the still is used in the static operation mode, i.e. filled with solution and then evaporated to dryness, the maximum deposit will accumulate. After continuous operation for about one year using a solution with a TDS of about 1000 parts per million (0.1%), then the layer precipitated will be about 0.050 mm thick assuming a processing rate of 5 ltr/m²/day. This layer will often have a grey-brownish appearance with a lower solar absorption than a clean, black surface.

Cleaning can easily be effected by first removing the glass window in its frame from its seal by using the convenient, captivated clamping screws. This gives easy access to the individual, ideally shaped cells with their rounded corners. Exposure to sunlight will generally result in crazing of the deposit due to differential, thermal expansion coefficients between the cell material (often a plastic) and the deposit. It can then be scrubbed and flushed away, the window replaced, and the panel used again and again.

Harder to remove deposits can often be removed by soaking for a few hours in either dilute citric acid (lemon or orange juice) or dilute acetic acid (vinegar).

To minimise the deposition of TDS and the resultant cleaning procedure, the still can be used in the dynamic operation mode. The solution is then continuously flowing through the still at a flow rate which is at least four times greater than the production rate of the distillate. This is a suitable method for processing seawater with a TDS of about 35,000 parts per million (3.5%) to produce potable water. Using this mode, virtually no deposits are produced for extended periods of operation.

The following features contribute, significantly to ease of use irrespective of whether the still is used in the outback, for domestic purposes or larger volume production by the interconnection of panels in series-parallel configurations.

(i) Strong, functional and aesthetically designed supporting legs with sufficient ground clearance to enable the use of a standard drink bottle to collect the output.

(ii) The legs can fold into preformed recesses or be demounted for ease of packing.

(iii) The legs can easily be fastened to the ground with standard, available tent pegs to prevent overturning under windy conditions and accidental upsetting.

(iv) The glass to panel, closed cavity, silicone rubber seal is long lasting and resistant to long exposures of intense, ultra violet light.

(v) The glass window can be toughened for rough usage conditions as required.

(vi) The glass window in its specially designed and die extruded aluminium frame can repeatedly be removed and replaced in its original position to provide the essential vapour sealing for maximum yields of potable water.

(vii) A fitted carry handle enables the lightweight still to be comfortably transportable over long distances.

Although various embodiments of the invention have been described in some detail, it is to be noted that the invention is not to be limited thereto, but can include variations and modifications falling within the spirit and scope of the inventive concept.

What is claimed is:

1. A solar still in the form of a tilted tray, said still including a base and upstanding side walls, a solar absorbing member supported by said base, said side walls supporting a glass cover positioned over said absorbing member on which vapor condenses, said solar absorbing member comprising a panel of black material having a plurality of individual cells over which water flows, and a thermal expansion member including one of a dome and a recess formed in the bottom of each cell to substantially eliminate or prevent distortion of the absorbing member wherein the glass cover is positioned adjacent the solar cells at a distance whereby vapor produced in each cell produces turbulence in each cell and wherein, the combined effect of the turbulence in all cells minimizes convective flow of air and vapor along the underside of the glass and wherein the glass cover is positioned within a range of 10 to 20 mm above the top of the cells.

2. The solar still according to claim 1, including a reflector positioned beneath the black material panel to redirect radiation absorbed by the black panel to enhance the overall heat gain.

3. A solar still in the form of a tilted tray, said still including a base and upstanding side walls, a solar absorbing member supported by said base, said side walls supporting a glass cover positioned over said absorbing member on which vapor condenses, said solar absorbing member comprising a panel of black material having a plurality of individual cells over which water flows, and a thermal expansion member including one of a dome and a recess formed in the bottom of each cell to substantially eliminate or prevent distortion of the absorbing member, wherein the dome is circular and is upstanding above the bottom of the cell by 5 or 6 mm.

* * * * *